United States Patent
Bourolleau et al.

(10) Patent No.: US 11,753,957 B2
(45) Date of Patent: Sep. 12, 2023

(54) METHOD FOR DETECTING A ROUGHNESS IN AN ABRADABLE LAYER IN A FAN CASING

(71) Applicant: SAFRAN AIRCRAFT ENGINES, Paris (FR)

(72) Inventors: Clément Bourolleau, Moissy-Cramayel (FR); Alexandre Branco, Moissy-Cramayel (FR); Serge Domingues, Moissy-Cramayel (FR); Vincent Fiore, Moissy-Cramayel (FR); Anwer Siraj, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 50 days.

(21) Appl. No.: 17/602,967

(22) PCT Filed: Apr. 10, 2020

(86) PCT No.: PCT/FR2020/000108
§ 371 (c)(1),
(2) Date: Oct. 11, 2021

(87) PCT Pub. No.: WO2020/208316
PCT Pub. Date: Oct. 15, 2020

(65) Prior Publication Data
US 2022/0195881 A1 Jun. 23, 2022

(30) Foreign Application Priority Data
Apr. 12, 2019 (FR) ........................ 1903936

(51) Int. Cl.
*F01D 11/12* (2006.01)
*F01D 21/00* (2006.01)
*F01D 25/24* (2006.01)

(52) U.S. Cl.
CPC .......... *F01D 11/122* (2013.01); *F01D 21/003* (2013.01); *F01D 25/24* (2013.01);
(Continued)

(58) Field of Classification Search
CPC ...... F01D 11/122; F01D 21/003; F01D 25/24; F05D 2220/31; F05D 2220/36; F05D 2300/516; F05D 2300/6111
See application file for complete search history.

(56) References Cited

U.S. PATENT DOCUMENTS

2006/0056959 A1* 3/2006 Sabol ................ F01D 17/08
415/118
2010/0117859 A1* 5/2010 Mitchell ............. G01K 1/024
340/870.16

(Continued)

FOREIGN PATENT DOCUMENTS

| EP | 2962844 A2 | 1/2016 |
|---|---|---|
| EP | 2990660 A1 | 3/2016 |
| EP | 3263844 A1 | 1/2018 |

OTHER PUBLICATIONS

International Search Report dated Jun. 26, 2020, issued in corresponding International Application No. PCT/FR2020/000108, filed on Apr. 10, 2020, and its English translation thereof, 2 pages.

(Continued)

*Primary Examiner* — Igor Kershteyn
(74) *Attorney, Agent, or Firm* — Christensen O'Connor Johnson Kindness PLLC

(57) ABSTRACT

A method for detecting at least one roughness in a face of an abradable layer in a fan casing is provided. The method includes a step of depositing on the abradable layer a first coating and a second coating covering the first coating. The first and second coatings have respective thicknesses (N1, N2) and a physical appearance that differ from one another. Local appearance of the first coating is indicative of a need (Continued)

for a localized touch-up, and local disappearance of the first coating and the second coating is indicative of a need for a localized replacement of the abradable layer.

13 Claims, 2 Drawing Sheets

(52) U.S. Cl.
CPC .... *F05D 2230/31* (2013.01); *F05D 2300/516* (2013.01); *F05D 2300/6111* (2013.01)

(56) References Cited

U.S. PATENT DOCUMENTS

| | | | |
|---|---|---|---|
| 2016/0003092 A1* | 1/2016 | Chamberlain | C04B 41/009 428/323 |
| 2016/0061049 A1* | 3/2016 | Playford | F01D 11/122 415/9 |
| 2016/0061050 A1* | 3/2016 | Keenan | F01D 11/122 415/118 |
| 2017/0362952 A1* | 12/2017 | Stoyanov | F01D 11/122 |

OTHER PUBLICATIONS

Written Opinion of the International Searching Authority dated Oct. 15, 2020, issued in corresponding International Application No. PCT/FR2020/000108, filed on Apr. 10, 2020, and its English translation thereof, 6 pages.

\* cited by examiner

METHOD FOR DETECTING A ROUGHNESS IN AN ABRADABLE LAYER IN A FAN CASING

CROSS-REFERENCE TO RELATED APPLICATIONS

This application is a National Stage of International Application No. PCT/FR2020/000108, filed Apr. 10, 2020, which claims priority to French Patent Application No. 1903936, filed Apr. 12, 2019, the entire disclosures of which are hereby incorporated by reference.

TECHNICAL FIELD

Embodiments of the present disclosure relate to a method for detecting at least one roughness in a face of an annular layer of abradable material in a fan casing. The present disclosure also relates to a method for repairing a roughness as well as a fan casing for an aircraft turbomachine.

By roughness is meant a surface unevenness due to a local, micrometer-sized removal of material from the face of the annular layer.

BACKGROUND

The prior art is illustrated by the documents EP-A1-2 990 660, EP-A1-3 263 844, US-A1-2016061049, EP-A2-2 962 844.

The main function of a fan casing assembled on an aircraft turbomachine is to ensure the retention in the event of debris ingestion or fan vane loss.

Some of the secondary functions of a fan casing are to ensure the mechanical continuity in forces and moments between an air inlet duct and an intermediate casing shell, to allow the attachment of the vein panels, such as the upstream acoustic shell, the cartridge of the abradable layer support and the downstream acoustic panel.

Other functions of the fan casing are to allow the attachment of the equipment and supports, to meet the specifications to fire and leakage and to allow the continuity of the electrical current for lightning protection.

For example, on a turbomachine, up to eighteen fan vanes can be installed opposite the abradable layer. This abradable layer, often made of solid colored porous material, crumbles during operation to ensure an optimum aerodynamic vein thanks to the fan vanes that come into contact with the layer.

When not in operation, a certain amount of clearance is required to ensure that the fan vanes can be mounted in the fan casing.

During operation, the inertia of the fan wheel, which consists of all the fan vanes, causes the wheel to move apart in order to fill the mounting clearance and to create an optimum aerodynamic vein.

To create this aerodynamic vein, the fan vanes come into contact with the abradable layer and crush it as required.

During operation, some abradable porous material may become detached from the rest of the surface as it crumbles.

This is not the only source of crumbling of the abradable layer, as during operation the fan may suck in foreign bodies, which may cause more or less abnormal damage to the abradable surface.

These missing surfaces or roughnesses, of the order of a few micrometers, on one face of the abradable layer sequentially opposite the vanes need to be systematically checked in order to place them in one of the following categories.

The first category is made up of small micrometric roughnesses forming minor cosmetic roughnesses that do not need to be touched-up.

The second category is made up of deeper but still micro-metrically sized and localized roughnesses forming medium cosmetic roughnesses that need to be retouched without involving a local replacement of the abradable layer.

The third category is made up of deeper roughnesses or major cosmetic roughnesses that require a replacement of the abradable layer in a larger or smaller local area.

Each roughness or missing surface is placed in a category according to its dimensional characteristics, mainly the size and the depth. It is therefore necessary that an operator is available with the specific equipment and controls each area one by one.

Thus, the abradable layer must remain intact in order to ensure its functions with respect to the fan vanes. In contrast, a wear layer, which may coat the abradable layer, will degrade to its full thickness when damaged. Such a degradation is possible because the wear layer does not play an essential role in the operation of the turbomachine, unlike the abradable layer.

Accordingly, the problem underlying the disclosure is to detect one roughness or roughnesses on a face of an annular layer of abradable material in a fan casing for an aircraft turbomachine and to identify the depth of the roughnesses without the need to remove the abradable layer from the fan casing.

SUMMARY

The disclosure proposes a method for detecting at least one roughness in a face of an annular layer of abradable material in a fan casing for an aircraft turbomachine, characterized in that it comprises:

a step of depositing on the face of the abradable layer a first coating and at least one second coating covering the first coating deposited directly on the abradable layer, each first or second coating having a precisely measured predetermined respective thickness and a physical aspect differentiating them from each other, a step of observing the abradable layer thus coated, a local appearance of the first coating on the face being representative of a roughness requiring a local touch-up and a local disappearance of the first coating after disappearance of the second coating on the face being representative of a roughness requiring a local replacement of the abradable layer around the roughness.

The proposal of the present disclosure consists in superimposing at least two coatings, advantageously in the form of a respective paint layer, on the abradable layer, the total thickness of the coatings being equivalent to the defined depth level of a roughness above which a serious roughness is detected and the thickness of the second coating superimposed on the first coating corresponding to a less serious roughness to be treated.

Both coatings, preferably in the form of a respective paint layer, can cover the face opposite a vane of the vane wheel and thus form the outermost face of the abradable layer.

The technical effect obtained is to detect one or more roughnesses as well as their level of depth by simple visual observation of the abradable layer and its coatings without dismounting the fan casing.

It is thus obtained, by simple visual observation, a detection and a graduation of the roughness or the roughnesses present in particular on the face opposite the vane then integrating the two coatings, advantageously in the form of a respective layer of paint. This speeds up the detection of a roughness or the roughnesses and makes it more accurate.

After such a visual observation, the abradable layer is ready to be treated according to its depth level, which represents a saving of time by not requiring a second detection of confirmation of the roughnesses, for example in the engineering office.

It is even possible for an operator of the fan casing to see the depth level of a roughness himself, as such a visual observation does not require any specific skills. Unjustified returns to the service department are thus avoided, which saves time and money. The touch-ups performed on an abradable layer are only performed when necessary and therefore always for the right reasons.

Due to the presence of two coatings, preferably paint coatings, for a recessed roughness, it is possible to differentiate the depth level of three types of roughnesses, namely a weak cosmetic roughness level when the first coating remains covered by the second coating at the level of the roughness, a stronger cosmetic roughness level when the first coating is visible by removal of the second coating at the level of the roughness, and a third, most severe level when the first coating has also disappeared at the level of the roughness.

In addition, the presence of two coatings, preferably in the form of a respective paint layer, on the face of the abradable layer opposite the vane wheel enhances its aesthetics.

The detection method does not require complicated action and does not differ fundamentally from a coating, in particular a paint coating of the face of the abradable layer opposite a vane, with the difference that the thickness of the coating is to be precisely controlled.

Preferably, prior to the implementation of the deposition step, a step of defining a first level and at least a second level of roughness depth affecting the abradable layer is conducted, the first and second depth levels being measured from the face and being representative of a need, for the first level of a local replacement of the abradable layer around the roughness or, for the second level, of a need for a local touch-up at the level of the roughness, the thickness of the at least one second coating being equal to the second level of depth and the thickness of the first covered coating being equal to the first level of depth minus the thickness of the at least one second coating, Advantageously, when a roughness is visible on the face with the first coating covered by the second coating in this roughness, it is concluded that a roughness is present which does not require any local touch-up.

Advantageously, the first level of roughness depth is at least greater than 0.5 millimeters and the second level of roughness depth is at least greater than 0.2 millimeters and less than 0.5 millimeters.

Advantageously, the first coating and the at least one second coating are in the form of a respective paint layer, a surface application on the face of the abradable layer with the first and second coatings being carried out by a lacquering or powder coating type method.

Before depositing, it is necessary to prepare the surface by sandblasting with a fine grain in order to create small points of adhesion which will facilitate the adhesion of the coatings.

The depositing can be made by a robot arm that rotates around the motor axis, the operation being performed under precisely controlled conditions, such as a blast flow, a rotation speed of the arm, a humidity and a temperature.

After each of the layers of paint has been deposited, an autoclave passage is required in order to polymerize the coating and to obtain a uniform layer of constant thickness, this passage being performed for, for example, 30 minutes at 200° C., the time varying according to the thickness of the layer deposited.

The main difficulty in implementing the method according to the disclosure is the control of the thickness of each of the coatings in correspondence with the depth level of a roughness corresponding to a given level.

For example, the superimposition of the two coatings shall not change the thickness of each of the coatings and there shall be no at least partial mixing between the two coatings. In addition, when not subject to a crumbling or a weathering of any kind, the thickness of the coatings should remain constant and not vary during the service life of the abradable layer.

It could be known to paint one face of an abradable layer opposite a vane but without using two coatings with different physical aspects that are easily recognizable from each other. This was only for aesthetic purposes and, where appropriate, to protect the abradable layer, but had no role in monitoring roughnesses created by crumbling or alteration on the abradable layer, which allows the implementation of the method according to the present disclosure.

Advantageously, the first coating and the at least one second coating have a different colorimetry.

Advantageously, the first coating and the at least one second coating respectively form a wear layer of the fan casing, each coating advantageously being adapted to degrade throughout its thickness.

The disclosure relates to a method for repairing a roughness in a face of an annular layer of abradable material in a fan casing for an aircraft turbomachine, characterized in that the at least one roughness having been detected in accordance with such a detection method, a local appearance of the first coating at the level of a roughness on the face is followed by a local touch-up of the roughness and a local disappearance of the first coating after disappearance of the second coating at the level of a roughness on the face is followed by a local replacement of the abradable layer around the roughness.

The disclosure also relates to a fan casing for an aircraft turbomachine comprising an annular layer of abradable material and implementing such a method of detecting at least one roughness in the face of the abradable layer, characterized in that the face of the layer of abradable material is covered by at least two coatings, each first or second coating having a precisely measured predetermined respective thickness and a physical aspect differentiating them from each other.

Such a fan casing brings a significant improvement in terms of satisfaction and safety of the user, as the user knows exactly the depth of the roughnesses occurring by crumbling of the abradable layer and the ways and costs of repairing them, as a roughness is detected with its depth level and undergoes the treatment best adapted to its depth level.

Advantageously, the first coating and the at least one second coating are paint layers, the physical aspect of the first and second coatings being given by one of the following parameters taken individually or in combination: a color, a tone, a texture.

The disclosure relates to an aircraft turbomachine characterized in that it comprises such a fan casing.

DESCRIPTION OF THE DRAWINGS

Other characteristics, purposes and advantages of the present disclosure will become apparent from the following detailed description and from the attached drawings, which are given as non-limiting examples and in which.

It should be kept in mind that the FIGURES are given as examples and are not limiting of the disclosure. They are schematic representations of principle intended to facilitate the understanding of the disclosure and are not necessarily on the scale of the practical applications. In particular, the dimensions of the various elements illustrated are not representative of the reality.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
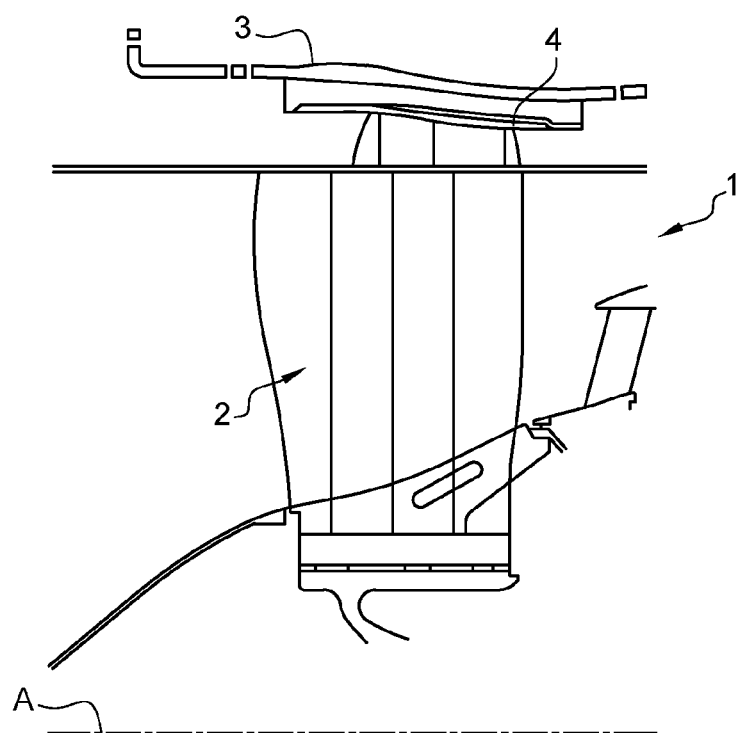
FIG. 1 is a schematic representation of a cross-sectional view of a fan of an aircraft turbomachine according to the prior art.

FIG. 1 is a partial representation of a fan of an aircraft turbomachine.

In a conventional way, a turbomachine comprises from upstream to downstream, i.e., in the direction of flow of the gas flows, a fan, one or more compressors, a combustion chamber, one or more turbines, and a nozzle for the ejection of the combustion gases leaving the turbine or the turbines.

The fan 1 comprises a vane wheel 2 which is surrounded by a fan casing 3, also referred to as a retention casing because of its function of retaining the vanes in the event of their breakage, or in the event of debris entering the fan.

Figure 2:
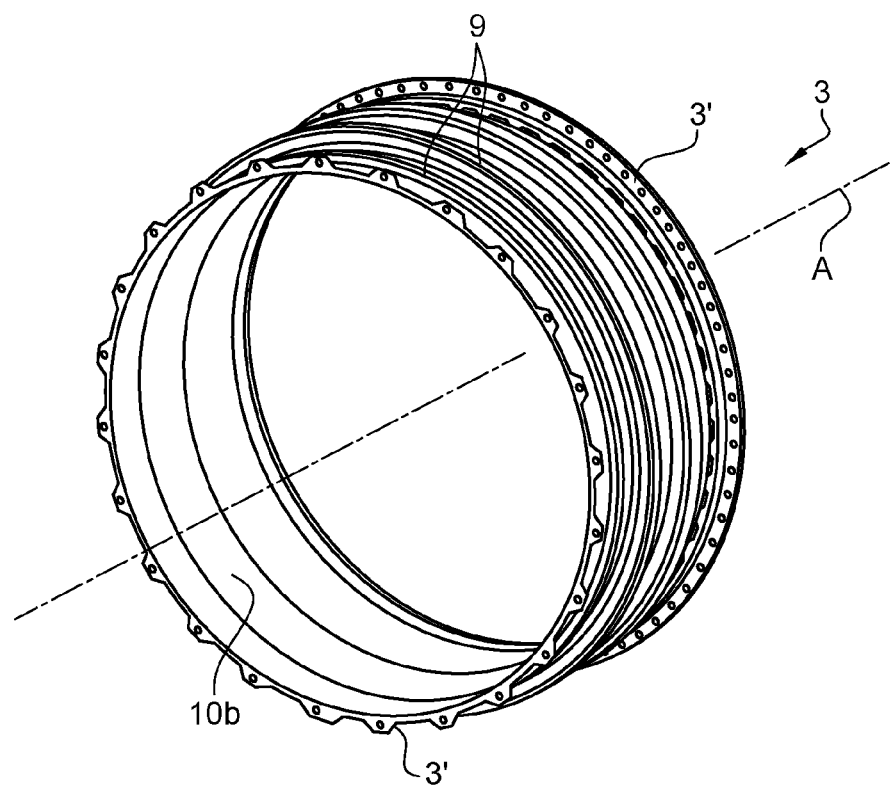
FIG. 2 is a schematic representation of a perspective view of a fan casing according to the prior art.

As can be seen from FIG. 2, the fan casing 3 has a generally cylindrical shape with an axis of revolution A.

It comprises an annular securing flange 3' at each of its axial ends. These flanges 3' are used to secure the casing 3 to annular walls of the nacelle of the turbomachine.

As shown in this FIG. 2, a layer of abradable material 10b is present inside the fan casing 3 by being of revolution in the fan casing 3.

The fan casing 3 therefore extends around the fan vane wheel 2. It thus comprises an inner cylindrical surface which is provided with an annular layer 10 of abradable material.

Figure 3:
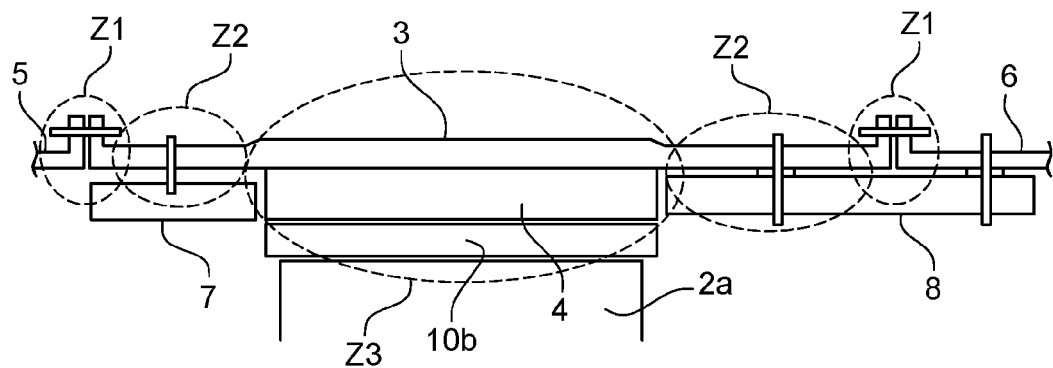
FIG. 3 is a schematic representation of a partial cross-sectional view of a fan casing according to the prior art.

As seen in FIG. 3, the annular layer 10b of abradable material, hereinafter referred to as the abradable layer 10b, extends around and at a short radial distance from one 2a of the vanes, sequentially during the rotation of the vane wheel 2. The vanes 2a can rub against the abradable layer 10b in operation and successively and wear it down by friction.

Figure 4:
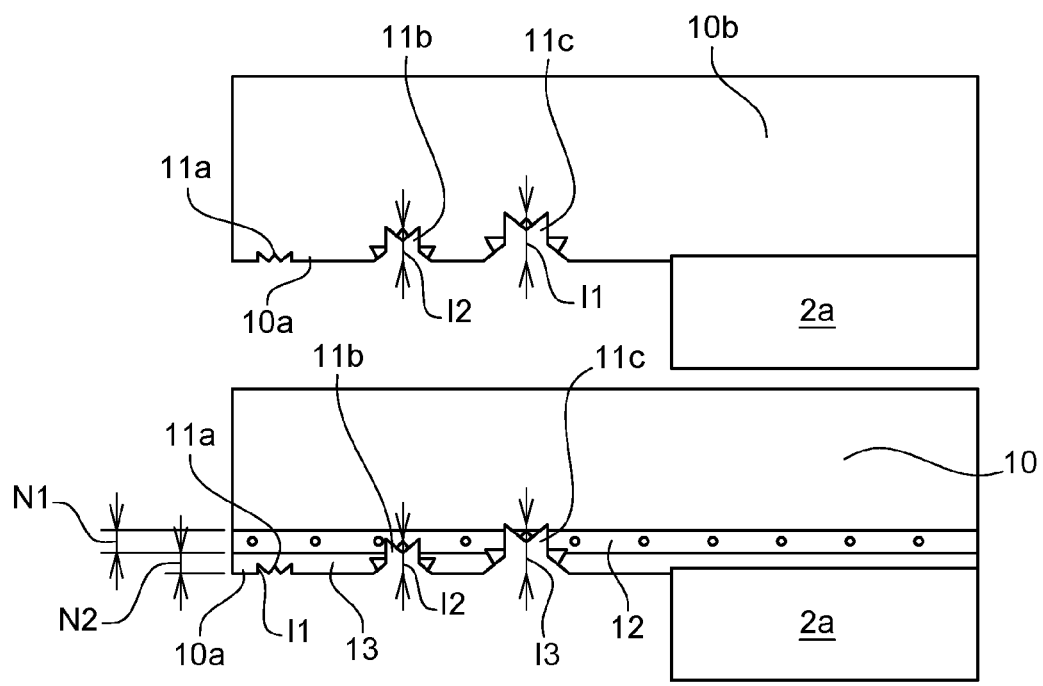
FIG. 4 is a schematic representation of two schematic cross-sectional views of an abradable layer for a fan casing according to the prior art without coating of the abradable layer and according to the present disclosure, respectively, with, in the latter case, a face opposite at least one fan vane being coated with two coatings, advantageously in the form of a respective paint layer, with different visible characteristics for a detection and a depth classification of one or more roughnesses.

This applies to an abradable layer 10b of the prior art as well as to an abradable layer 10 according to the present disclosure and shown in FIG. 4.

This allows to optimize the radial clearances between the vanes 2a and the surrounding fan casing 3 and thus to limit the gas leakage at the radially outer tips or ends of the vanes, and thus to optimize the performance of the turbomachine.

In the present technique as well as in the embodiments of the present disclosure, the abradable layer 10b may be supported by a solid or honeycomb structure support cartridge 4. This cartridge 4 is usually riveted or screwed to the fan casing 3.

The fan casing 3 is connected to an air inlet duct 5 on the one hand and to an intermediate casing shell 6 on the other hand. It also carries an upstream acoustic shell 7 and a downstream acoustic panel 8.

Without being essential to the scope of the present disclosure, three types of area may be recognized on the fan casing 3.

The first type of areas, referred to as areas Z1, groups together the flange areas by comprising an upstream flange area and a downstream flange area. The upstream flange area comprises the connection between the fan casing 3 and the air inlet duct 5 and the downstream flange area comprises the connection between the fan casing 3 and the intermediate casing shell 6.

The second type of areas, referred to as the areas Z2, groups together the structural areas by comprising an upstream structural area and a downstream structural area. The upstream structural area is located at the level of the upstream acoustic shell 7 and the downstream structural area is located at the level of the downstream acoustic panel 8.

The third type of area comprises a single retention area, referred to as area Z3. This area Z3 ensures the primary function of the fan casing 3 and guarantees the static and dynamic mechanical strength of the assembly by ensuring a fast dynamics. The third area Z3 houses the median portion of the fan casing 3, the support cartridge 4 of the abradable layer 10b and the abradable layer 10b.

As mentioned above, and with reference to FIG. 4, the abradable layer 10 or 10b may be damaged, for various reasons and not only due to its cooperation with the vane wheel, by the formation of a locally recessed surface forming a local roughness 11a, 11b, 11c in the layer and this according to several levels of depth requiring respectively, in the direction of an increasing depth, no repair, a local touch-up or a more important work of local replacement of the layer of abradable material.

It is difficult to differentiate between roughnesses 11a, 11b, 11c with different levels of depth with the naked eye. It is then necessary to dismount the fan casing to gain access to the abradable layer 10 or 10b, which is precisely what the present disclosure seeks to avoid.

Referring principally to FIG. 4 but also to FIG. 3, the present disclosure relates to a method for detecting at least one roughness on a face of an annular layer of abradable material 10 in a fan casing 3 for an aircraft turbomachine by identifying its depth on which the possible repair works to be undertaken on the abradable layer 10 depends.

The face 10a having this roughness or these roughnesses, advantageously a lack of material forming a more or less wide and/or more or less deep roughness 11a, 11b, 11c, of respective depths referenced 11, 12 and 13 is the face 10a opposite of sequentially one 2a of the vanes of a fan vane wheel as shown previously in FIG. 3.

The roughness or the roughnesses are caused, in particular but not only, by local crumbling on the opposite face 10a causing a creation on the face 10a, opposite a vane 2a, of a roughness 11a, 11b, 11c of a respective depth 11, 12, 13 in the abradable layer 10.

In FIG. 4, a comparison between an abradable layer 10b according to the prior art and an abradable layer 10 according to the present disclosure is shown, the abradable layer 10b according to the prior art being the top layer and the abradable layer 10 according to the present disclosure being the bottom layer in FIG. 4.

In both cases, three types of roughness are shown in the form of a respective roughness 11a, 11b, 11c. It is of course possible that there are other roughnesses with intermediate roughnesses or even deeper roughnesses.

The method according to the present disclosure may begin with a definition step, a step which is not necessarily necessary for its implementation.

In this step, a definition of a first N1+N2 and of at least a second level N2 of roughness depth affecting the abradable layer 10 is performed.

The first and at least second levels N1+N2, N2 of depth are measured from the face 10a and representative of a need, for the first level N1+N2, for a local replacement of the abradable layer 10 around the roughness 11c or, for the second level N2, a need for a local touch-up at the level of the roughness 11b.

In FIG. 4, the roughness 11a of smallest depth, for example of a depth 11 of 0 to 0.2 millimeters, corresponds to a minor cosmetic defect requiring no treatment, the roughness 11b of average depth 12, for example of a depth of 0.2 to 0.5 millimeters corresponds to a major cosmetic defect requiring a local touch-up, and the roughness 11c of greatest thickness 13, for example of a depth greater than 0.5 millimeters, corresponds to a serious roughness requiring a local replacement of the abradable layer 10.

According to the prior art, it was not possible to differentiate these roughnesses 11a, 11b, 11c from each other, in particular an average roughness 11b from a largest roughness 11c.

For an abradable layer 10 according to the present disclosure, as shown in the lower part of FIG. 4, a step of depositing on the face 10a of the abradable layer 10 opposite a vane 2a a first coating 12 and at least one second coating 13, advantageously in the form of a layer of paint, covering the first coating 12 is performed, this first coating 12 being deposited directly on the abradable layer.

Each first coating 12 or second coating 13 has a precisely measured predetermined respective thickness N1, N2 and a physical aspect differentiating them from each other for recognizing which coating is visible from the opposite face 10a and, where appropriate, recognizing whether the first coating 12 has locally disappeared.

The thickness N2 of the at least one second coating 13 being the outermost to the abradable layer 10 may be equal to the second depth level N2 and the thickness N1 of the first covered coating 12 being the innermost to the abradable layer 10 may be equal to the first depth level N1+N2 minus the thickness N2 of the at least one second coating 13.

In the above-mentioned case, for the small, medium and large roughnesses 11a, 11b, 11c with a depth respectively less than 0.2 millimeters, between 0.2 and 0.5 millimeters, and greater than 0.5 millimeters, the thickness of the second coating 13 is 0.2 millimeters and the thickness N1 of the first coating 12 is 0.5-0.2 millimeters, i.e., 0.3 millimeters.

The first coating 12 and the at least one second coating 13 respectively form a wear layer of the fan casing, in particular around the abradable layer 10. Thus, according to the disclosure, the first coating 12 and the second coating 13 degrade respectively in their entire thickness before the abradable layer 10. Preferably, the second coating 13 firstly degrades to its entire thickness, and then the first coating 12 degrades secondly to its entire thickness. This allows to detect the roughnesses, of different depths in particular, depending, for example, on the thickness of the coatings 12, 13 and their colors.

A step of observing the abradable layer 10 thus coated is performed. A local appearance of the first coating 12 on the face 10a opposite the abradable layer 10 opposite a vane 2a is representative of a roughness 11b requiring local touch-up and a local disappearance of the first coating after disappearance of the second coating 13 on the face 10a opposite the vane 2a is representative of a roughness 11c requiring a local replacement of the abradable layer 10 around the roughness 11a, 11b, 11c.

When a roughness 11a, 11b, 11c is visible on the face 10a opposite the vane 2a with the first coating 12 covered by the second coating 13 in this roughness 10a, it is concluded that there is a roughness 11a which does not require any local touch-up. Only the second coating 13 has been slightly damaged, which is illustrated by the smallest roughness 11a.

It is to be considered that the definition of more than two levels of roughness depth affecting the abradable layer 10 is possible.

In this case, as many coatings, preferably in the form of a respective paint layer, can be provided on the face 10a opposite a vane 2a of the abradable layer 10 as there are defined levels.

The first and at least one second coatings may be in the form of a paint layer. A surface application on the face 10a opposite a vane 2a of the abradable layer 10 with the first and second coatings 12, 13 may be carried out by a method of the lacquering or powder coating type using a robot arm.

According to the detection method in accordance with the present disclosure, it is possible to simultaneously detect a plurality of roughnesses of different depths on a single abradable layer 10 by observing the state of the first and second coatings 12, 13 or additional coatings.

In FIG. 4, the roughnesses 11a, 11b, 11c are not directly opposite the fan vane 2a, but this may also be possible. In any case, the repairs should be made to the roughnesses 11b, 11c corresponding to major cosmetic roughnesses.

The disclosure relates to a method for repairing a roughness 11b, 11c on a face of an annular layer of abradable material 10 in a fan casing 3 for an aircraft turbomachine.

After at least one roughness has been detected in accordance with a detection method as previously described, if a portion of the first coating 12 has locally appeared at the level of a roughness 11b, preferably at the level of the bottom of the roughness 11b on the face 10a of the abradable layer 10 opposite a vane 2a, a local touch-up of the roughness 11b is conducted.

Furthermore, if the first coating 12 has also disappeared as well as the second coating 13 at the level of a roughness 11c, preferably at the level of the bottom of the roughness 11c, on the face 10a of the abradable layer 10 opposite a vane 2a, a local replacement of the abradable layer 10 around the roughness 11c is conducted.

With reference to all the FIGURES, the disclosure also relates to a fan casing 3 for an aircraft turbomachine comprising an annular layer of abradable material 10 having a face opposite of sequentially one 2a of the vanes of a fan vane wheel 2.

As at least one roughness on the face 10a opposite of sequentially one 2a of the vanes may be, among other possible causes of creation of roughnesses, caused by a local crumbling of the layer of abradable material on the opposite face 10a causing a creation on the face 10a of a roughness 11a, 11b, 11c of a respective depth 11, 12, 13 in the abradable layer 10, the fan casing 3 implements a method for detecting at least one roughness or a repair method as previously described.

Prior to the detection or repair methods, first and second depth levels N1+N2, N2 may have been defined.

In this fan casing 3, the face 10a opposite one 2a of the vanes of the layer of abradable material 10 is covered by at least two coatings 12, 13, advantageously of paint, the face the outermost to the abradable layer 10 of the second coating then forming the opposite face 10a. Each first 12 or second 13 coating has a precisely measured predetermined respective thickness and a physical aspect that differentiates them from each other.

The thickness N2 of the second coating 13 may be equal to the second depth level and the thickness N1 of the first coated coating 12 may be equal to the first depth level N1+N2 minus the thickness N2 of the second coating 13 or of the other coatings when their number exceeds two.

The physical aspect of the first and second coatings 12, 13 may be given by any of the following parameters taken individually or in combination: a color, a tone, a texture.

The first coating 12 and the at least one second coating 13 may, for example, have different colorimetry.

These parameters are visually recognizable parameters to help recognize the depth of a roughness.

Finally, the disclosure relates to an aircraft turbomachine comprising a fan casing 3 as previously described.

The disclosure is by no means limited to the described and illustrated embodiments which have been given only as examples.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method for detecting at least one roughness in a face of an annular layer of abradable material in a fan casing for an aircraft turbomachine, the method comprising:
 a deposition step of depositing on said face of the abradable layer a first coating and at least one second coating covering the first coating wherein the first coating has a first thickness and a first physical aspect, and wherein the second coating has a second thickness and a corresponding second physical aspect which differs from the first physical aspect, and
 an observation step of observing the abradable layer coated with the first coating and the second coating, wherein observing a local appearance of the first coating on said face is representative of a roughness requiring a local touch-up and wherein observing a local disappearance of the first coating and the at least one second coating on said face is representative of a roughness requiring a local replacement of the abradable layer around the roughness.

2. The method according to claim 1, further comprising a definition step performed prior to the deposition step, wherein the definition step comprises defining a first level of roughness depth and at least a second level of roughness depth affecting the abradable layer, wherein the first level of roughness depth is greater than the second level of roughness depth, wherein the first and second roughness depth levels are measured from said face, wherein the first level of roughness depth represents a need for a local replacement of the abradable layer around the roughness, wherein the second level of roughness represents a need for a local touch-up at the level of the roughness, wherein the second thickness of said at least one second coating is equal to the second level of roughness depth and wherein the first thickness of the first coating is equal to the first level of roughness depth minus the second thickness of said at least one second coating.

3. The method according to claim 1, wherein during the observation step, when a roughness is visible on said face with the first coating covered by the second coating in that roughness, it is concluded by visual recognition that the roughness does not require any local touch-up.

4. The method according to claim 1, wherein the first level of roughness depth is greater than 0.5 millimeters and wherein the second level of roughness depth is greater than 0.2 millimeters and less than 0.5 millimeters.

5. The method according to claim 1, wherein the first coating and said at least one second coating are respective paint layers, wherein depositing on said face of the abradable layer the first coating and the at least one second coating covering the first coating is carried out by lacquering or powder coating with the aid of a robot arm.

6. The method according to claim 5, wherein the first physical aspect of the first coating is a first color, and wherein the second physical aspect of the at least one second coating is a different second color.

7. The method according to claim 1, further comprising:
 after observing the local appearance of the first coating at a level of the roughness on said face, touching up the roughness; or
 after observing a local disappearance of the first coating and the at least one second coating at the level of the roughness on said face, replacing the abradable layer around the roughness.

8. A fan casing for an aircraft turbomachine comprising an annular layer of abradable material and upon which a method for detecting at least one roughness in said face of the abradable layer according to claim 1 is implemented, wherein said face of the layer of abradable material is covered by the first coating and the at least one second coating.

9. The fan casing according to claim 8, wherein the first coating and said at least one second coating are paint layers, wherein the first physical aspect and the second physical aspect are selected from the group consisting of: a color, a tone, and a texture.

10. An aircraft turbomachine, comprising the fan casing according to claim 8.

11. A method for detecting at least one roughness in a face of an annular layer of abradable material in a fan casing for an aircraft turbomachine, the method comprising:
 a definition step comprising defining a first level of roughness depth and at least a second level of roughness depth affecting the abradable layer, wherein the first level of roughness depth is greater than the second level of roughness depth, wherein the first and second roughness depth levels are measured from said face, wherein the first level of roughness depth represents a need for a local replacement of the abradable layer around the roughness, wherein the second level of roughness represents a need for a local touch-up at the level of the roughness, a deposition step of depositing on said face of the abradable layer a first coating and at least one second coating covering the first coating wherein the first coating has a first thickness and a first physical aspect, and wherein the second coating has a second thickness and a corresponding second physical aspect which differs from the first physical aspect, wherein the second thickness of said at least one second coating is equal to the second level of roughness depth and wherein the first thickness of the first coating is equal to the first level of roughness depth minus the second thickness of said at least one second coating, and an observation step of observing the abradable layer coated with the first coating and the second coating, wherein observing a local appearance of the first coating on said face is representative of a roughness requiring a local touch-up and wherein observing a local disappearance of the first coating and the at least one second coating on said face is representative of a roughness requiring a local replacement of the abradable layer around the roughness.

12. A method for detecting at least one roughness in a face of an annular layer of abradable material in a fan casing for an aircraft turbomachine, the method comprising:

a deposition step of depositing on said face of the abradable layer a first coating and at least one second coating covering the first coating wherein the first coating has a first thickness and a first physical aspect, and wherein the second coating has a second thickness and a corresponding second physical aspect which differs from the first physical aspect, and an observation step of observing the abradable layer coated with the first coating and the second coating, wherein observing a local appearance of the first coating on said face is representative of a roughness requiring a local touch-up and wherein observing a local disappearance of the first coating and the at least one second coating on said face is representative of a roughness requiring a local replacement of the abradable layer around the roughness, and wherein during the observation step, when a roughness is visible on said face with the first coating covered by the second coating in that roughness, it is concluded by visual recognition that the roughness does not require any local touch-up.

13. A method for detecting at least one roughness in a face of an annular layer of abradable material in a fan casing for an aircraft turbomachine, the method comprising:

a deposition step of depositing on said face of the abradable layer a first coating and at least one second coating covering the first coating wherein the first coating has a first thickness and a first physical aspect, and wherein the second coating has a second thickness and a corresponding second physical aspect which differs from the first physical aspect, and an observation step of observing the abradable layer coated with the first coating and the second coating, wherein observing a local appearance of the first coating on said face is representative of a roughness requiring a local touch-up and wherein observing a local disappearance of the first coating and the at least one second coating on said face is representative of a roughness requiring a local replacement of the abradable layer around the roughness and after observing the local appearance of the first coating at a level of the roughness on said face, touching up the roughness; or after observing a local disappearance of the first coating and the at least one second coating at the level of the roughness on said face, replacing the abradable layer around the roughness.

\* \* \* \* \*